(12) United States Patent
Hashimoto

(10) Patent No.: US 8,231,837 B2
(45) Date of Patent: Jul. 31, 2012

(54) THERMAL CRACKING TUBE

(75) Inventor: Kunihide Hashimoto, Ikoma (JP)

(73) Assignee: Kubota Corporation, Osaka-shi (JP)

( * ) Notice: Subject to any disclaimer, the term of this patent is extended or adjusted under 35 U.S.C. 154(b) by 313 days.

(21) Appl. No.: 12/593,867

(22) PCT Filed: Mar. 28, 2008

(86) PCT No.: PCT/JP2008/056008
§ 371 (c)(1),
(2), (4) Date: Sep. 29, 2009

(87) PCT Pub. No.: WO2008/120699
PCT Pub. Date: Oct. 9, 2008

(65) Prior Publication Data
US 2010/0143206 A1    Jun. 10, 2010

(30) Foreign Application Priority Data

Mar. 30, 2007  (JP) .................................. 2007-091364

(51) Int. Cl.
*B01J 19/00*  (2006.01)
*B01J 8/06*  (2006.01)

(52) U.S. Cl. ........ 422/198; 422/312; 422/655; 422/659; 165/133; 165/183; 165/184; 585/921; 208/132

(58) Field of Classification Search ............... 422/132, 422/655, 659, 198, 312; 165/183, 184, 133; 585/921; 208/132
See application file for complete search history.

(56) References Cited

U.S. PATENT DOCUMENTS 5,070,937 A * 12/1991 Mougin et al. ............... 165/133
2006/0102327 A1   5/2006 Inui et al.

FOREIGN PATENT DOCUMENTS

| JP | 61-289293 A | 12/1986 |
|---|---|---|
| JP | 09-243283 A | 9/1997 |
| WO | 2004-046277 A1 | 6/2004 |

OTHER PUBLICATIONS

Notification of Transmittal of Translation of the International Preliminary Report on Patentability (Form PCT/IB/338) of International Application No. PCT/JP2008/056008 mailed Oct. 22, 2009 with forms PCT/IB/326, PCT/IB/373, PCT/ISA/237.
International Search Report for PCT/JP2008/056008, Mailing Date of Apr. 22, 2008.

* cited by examiner

*Primary Examiner* — Walter D Griffin
*Assistant Examiner* — Lessanework Seifu
(74) *Attorney, Agent, or Firm* — Westerman, Hattori, Daniels & Adrian, LLP

(57) ABSTRACT

A thermal cracking tube is adapted to suppress pressure losses while maintaining heat transfer promoting effect on the fluid inside the tube. The tube has a plurality of projections rows extending circumferentially along inner surface of the tube orthogonal to or as inclined with respect to the axis of tube, each of the projection rows including a plurality of projections provided on the tube inner surface. The tube is defined by $S/10\pi D=0.2-0.7$, $h/D=0.02-0.05$ and $L/\pi D=0.04-0.5$. D is inner diameter of the tube, h is height of projection A arbitrarily chosen in a projection row $\alpha$, L is length of circular arc of projection A in a direction orthogonal to tube axis, and S is area of a region R surrounded by projection A, phantom lines L1 and L2 (extending respectively from circumferentially opposite ends of projection A in parallel to tube axis) and projection row $\beta$ downstream from projection row $\alpha$.

11 Claims, 4 Drawing Sheets

F I G. 3
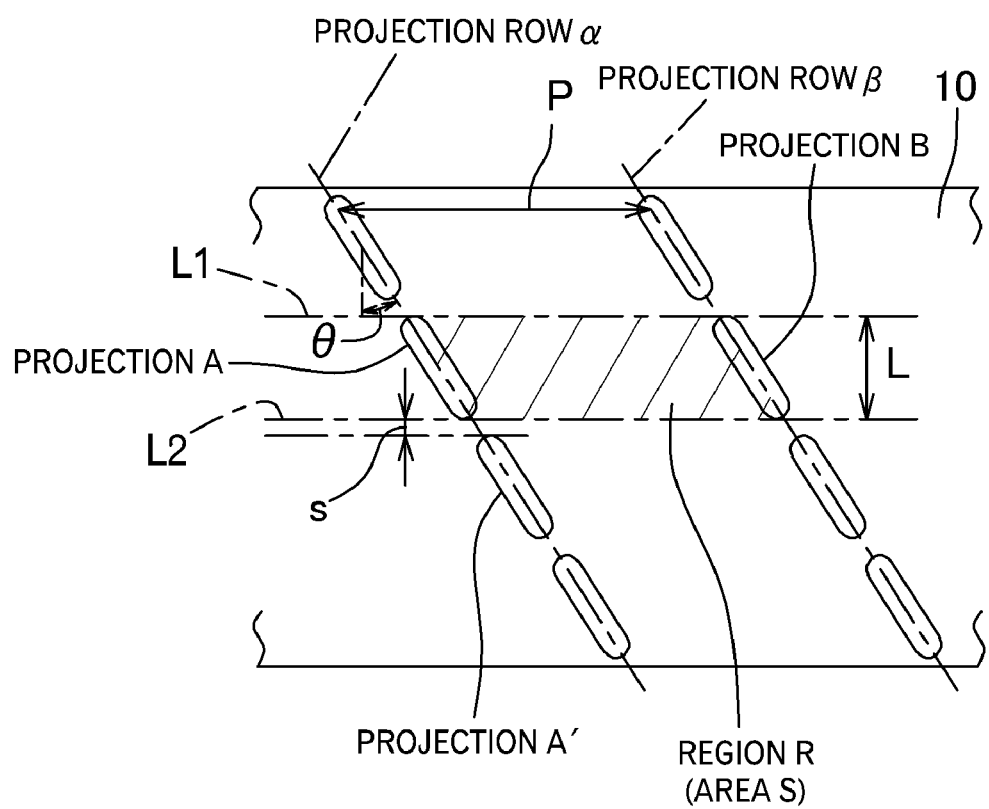

THERMAL CRACKING TUBE

TECHNICAL FIELD

The present invention relates to thermal cracking tubes for use in thermal cracking reactors for producing ethylene or the like, and more particularly to hydrocarbon thermal cracking tubes having projections formed on the inner surface of the tube for producing an enhanced effect to agitate a fluid flowing inside the tube, the tube being adapted to reduce pressure losses to the greatest possible extent while ensuring a high thermal transfer efficiency for the fluid inside the tube.

BACKGROUND ART

Olefins such as ethylene and propylene are produced by causing a material fluid of hydrocarbon (such as naphtha, natural gas or ethane) to flow at a high velocity through a thermal cracking tube heated from outside and heating the material fluid to a reaction temperature range for thermal cracking.

To effect the thermal cracking reaction efficiently, it is important that the material fluid to be passed at a high velocity through the tube be heated to the thermal cracking temperature range throughout the tube channel to the radially central portion thereof, with overheating avoided to the greatest possible extent. If the material fluid is overheated, hydrocarbons are excessively converted to light fractions (formation of methane, free carbon, etc.) or cracked products will be subjected to polycondensation reaction to result in a greater reduction in the yield of the desired product. Overheating also results in promoted coking (deposition of free carbon on the tube inner surface) to give a lower heat transfer coefficient to the tube, entailing a need for frequent decoking work.

Accordingly, it is practice to provide on the inner surface of the thermal cracking tube projections serving to agitate the fluid flow, such that the agitation by the projections ensures improved heat transfer to the fluid flowing at a high velocity for a rise in the temperature by rapid heating (see, for sample, Patent Literature 1). Consequently, the reaction terminates within a shorter period of time to avoid the conversion to light fractions due to overheating. Furthermore, the improved heat transfer efficiency of the thermal cracking tube makes it possible to heat the thermal cracking tube at a lower temperature to entail the advantage of extending the service life of the cracking tube.

Patent Literature 1 discloses a thermal cracking tube wherein a region having no projections extends over the entire length of the tube in parallel to the axis thereof to assure a reduced pressure loss without impairing the heat transfer efficiency of the tube.

Patent Literature 1: Republished Patent WO2004-046277

DISCLOSURE OF THE INVENTION

The Problem to be Solved

It is required that the thermal cracking tube of Patent Literature 1 be further improved in thermal transfer efficiency and reduced in pressure losses.

We have found that the thermal cracking tube can be further improved in heat transfer efficiency and reduced in pressure losses by adjusting the height of projections, length of the projections, and the area range wherein the projections act on the fluid inside the tube in accordance with the inside diameter of the tube. This finding has matured to the present invention.

The present invention provides a thermal cracking tube which is adapted to suppress pressure losses to the greatest possible extent while maintaining a heat transfer promoting effect on the fluid inside the tube.

Means for Solving the Problem

To solve the foregoing problem, the present invention provides a thermal cracking tube for passing a fluid therethrough from one end thereof toward the other end, the tube having a plurality of rows of projections extending circumferentially along an inner surface of the tube orthogonal to or as inclined with respect to the axis of tube, each of the projection rows including a plurality of projections provided on the tube inner surface, the tube being defined by:

$$S/10\pi D = 0.2\text{-}0.7,$$

$$h/D = 0.02\text{-}0.05, \text{ and}$$

$$L/\pi D = 0.04\text{-}0.5$$

wherein D is the inside diameter of the tube, h is the height of an optional projection A included in a projection row α, L is the length of circular arc of the projection A in a direction orthogonal to the tube axis, and S is the area of a region R surrounded by the projection A, phantom lines L1 and L2 extending respectively from circumferentially opposite ends of the projection A in parallel to the tube axis and a projection row β downstream from the projection row α.

Advantage of the Invention

The thermal cracking tube is adapted to suppress pressure losses to the greatest possible extent while maintaining a high heat transfer efficiency by defining the height h of the projection A on the inner surface of the tube, the length L of the circular arc thereof in a direction orthogonal to the tube axis and the area S, based on the inside diameter D of the tube.

BRIEF DESCRIPTION OF THE DRAWINGS

FIG. 3 is a development along the axial direction of the tube of FIG. 1;

BEST MODE OF CARRYING OUT THE INVENTION

A thermal cracking tube 10 generally comprises a plurality of straight tubes interconnected by bends into a zigzag form and is provided in a thermal cracking reactor and heated from outside the tube.

Figure 1:
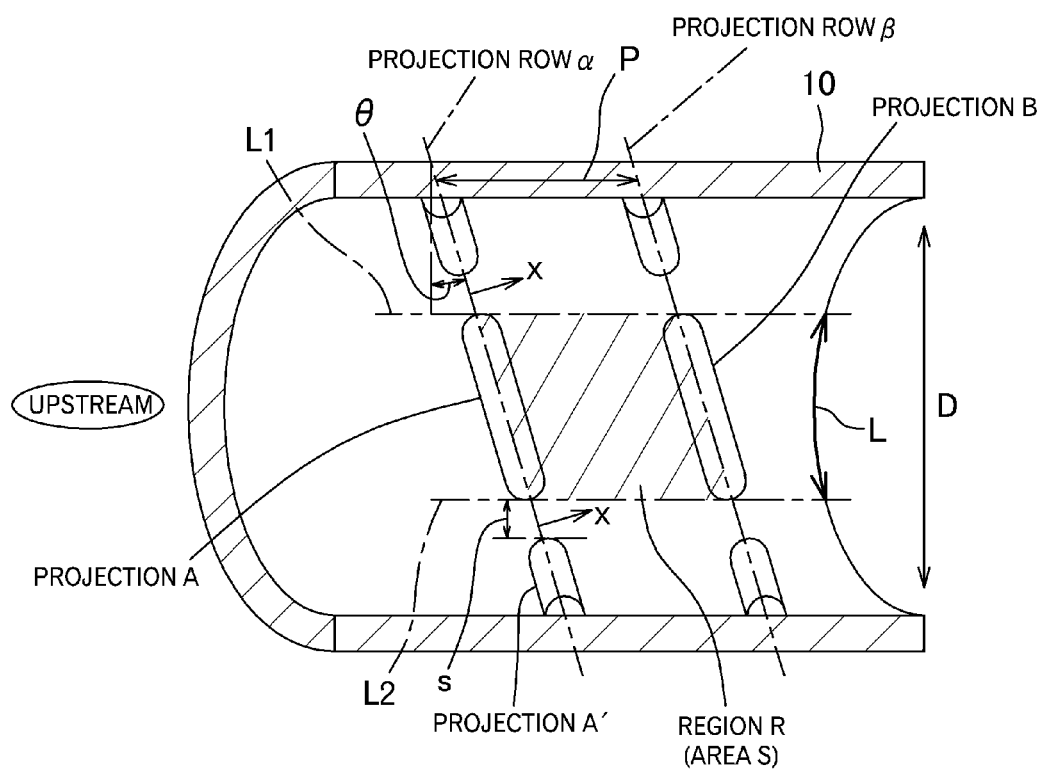
FIG. 1 is a perspective view in section of a thermal cracking tube of the invention.
Figure 2:
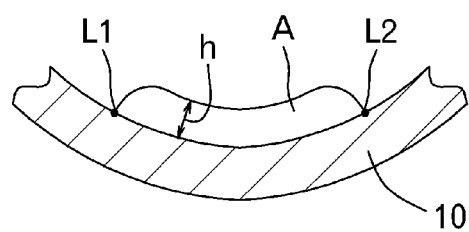
FIG. 2 is a fragmentary view in section taken along the line X-X in FIG. 1.

FIG. 1 is a sectional perspective view showing an embodiment of thermal cracking tube 10 (straight tube) of the invention, FIG. 2 is a fragmentary view in section taken along the line X-X in FIG. 1, and FIG. 3 is a development along the axial direction of the tube of FIG. 1. In FIGS. 1 and 3, the left side of the plane of the drawing is the upstream side, and the right side thereof is the downstream side.

With reference to the drawings, the thermal cracking tube 10 is provided with a plurality of rows α, β of projections circumferentially of the tube. The projection rows α, β include projections A and projections B, respectively.

According to the present invention, the term projection row means a group of projections provided on the inner surface of the thermal cracking tube 10 in a row circumferentially thereof. When the projection row is defined, for example, with respect to the length or area thereof, the row is defined as a line through the projections centrally thereof (the projection row α or β shown in FIGS. 1 and 3 and indicated in a chain line).

The projection row a and the projection row β can be made to extend in parallel helically at an angle of inclination θ with respect to a plane orthogonal to the tube axis (see FIGS. 1 and 3). In this case the angle of inclination θ is preferably up to 20 deg, more preferably up to 15 deg. The angle of inclination θ can be altered in one row, or can be different from row to row.

Each projection row can be annular independently of another, and orthogonal to the tube axis or positioned at an angle of inclination with respect to the tube axis. In the case where the projection row is helical, the row is not limited to a single row but a plurality of helical rows may be provided.

The projections can be formed efficiently in the shape of overlay beads, for example, by powder plasma welding (PTA welding) or like overlay welding method. The projections can be formed in parallel to or as inclined from the row.

The projections can be made from a heat-resistant alloy material of the same kind as the thermal cracking tube 10. Examples of such materials are 25Cr—Ni(SCH22), 25Cr-35Ni(SCH24) and Incoloy (trademark). Also suitably usable are various other heat-resistant alloy materials which are capable of withstanding the environment in which the thermal cracking tube 10 is to be used.

Now, with reference to FIGS. 1 to 3, suppose the inside diameter of the thermal cracking tube 10 is D (mm), the height of an optional projection A included in the projection row a is h (mm), the length of circular arc of the projection A in a direction orthogonal to the tube axis is L (mm), the center-to-center distance between the projection row α and the projection row β downstream therefrom is P (mm), the area of a region R surrounded by the projection A, phantom lines L1 and L2 extending respectively from circumferentially opposite ends of the projection A in parallel to the tube axis and the projection row β downstream from the projection row α is S (mm$^2$), the length of a circular arc as measured in a direction orthogonal to the tube axis and corresponding to the end-to-end circular arc distance between the projection A and another projection A' adjacent thereto in the projection row α is s (mm) and the angle of inclination of the projection row α with respect to a plane orthogonal to the tube axis is θ.

[Inside Diameter D of Thermal Cracking Tube]

It is desired that the inside diameter D of the thermal cracking tube 10 be 30 mm to 200 mm. The lower limit of the inside diameter D is intended to ensure space for providing the rows of projections, and the upper limit can be determined in view of the agitation of the fluid by the projections and heating efficiency.

[Center-to-Center Distance P Between Projection Rows α, β]

In the case where the projection rows are helical, the center-to-center distance P between the rows α, β is determined according to the inside diameter D of the tube 10 and the above-mentioned angle of inclination θ, and is preferably 20 to 100 mm. In the case where a plurality of projection rows are provided, the center-to-center distance P between the adjacent rows is preferably 20 to 100 mm.

In either of the case where a plurality of projection rows are provided and the case where each projection row is annular independently of another, and orthogonal to the tube axis or positioned at an angle of inclination with respect to the axis, the center-to-center distance P between the adjacent rows is preferably 20 to 100 mm.

[Area S of Region R]

The area S of the region R is defined by $S/10\pi D=0.2$-$0.7$, preferably by $S/10\pi D=0.3$-$0.6$.

A fluid of high temperature remains on the inner surface layer of the thermal cracking tube 10, forming a laminar film of high temperature and producing a phenomenon that full heat transfer is not effected between the tube 10 and the fluid inside the tube. In the case where projections A are formed on the inner surface of the tube 10, the projections A agitate the fluid, presumably breaking the laminar film to thereby effect appropriate heat transfer. When a large number of projections are provided on the inner surface of the tube 10, the projections will individually agitate the fluid. When the downstream side of each projection where the projection acts to agitate the fluid is given a specified area, we have found that the projection acts to agitate the fluid uniformly over the specified area, whereby heat is transferred from the tube to the fluid inside the tube within the specified area without variations in temperature. More specifically, the area surrounded by a projection and the projection row downstream from the projection, i.e., the area S of a region R (see FIG. 1) provided between the projection A and the projection row β downstream therefrom, is compared with the interior area of the tube having a diameter D over a unit tube length of 10 mm. We have found that if this value is in the foregoing range of 0.2 to 0.7 (preferably in the range of 0.3 to 0.6), the heat transfer can be effected efficiently.

The region R provided downstream from the projection A is a region surrounded by the projection A, the phantom lines L1 and L2 extending respectively from circumferentially opposite ends of the projection A in parallel to the tube axis and the projection row β downstream from the projection A. As shown in FIG. 1, when the projection A and the projection row β are parallel, the area of the region R is that of a rectangular parallelogram. If the projection row α and the projection row β are both orthogonal to the tube axis, the region R is rectangular.

Figure 5:
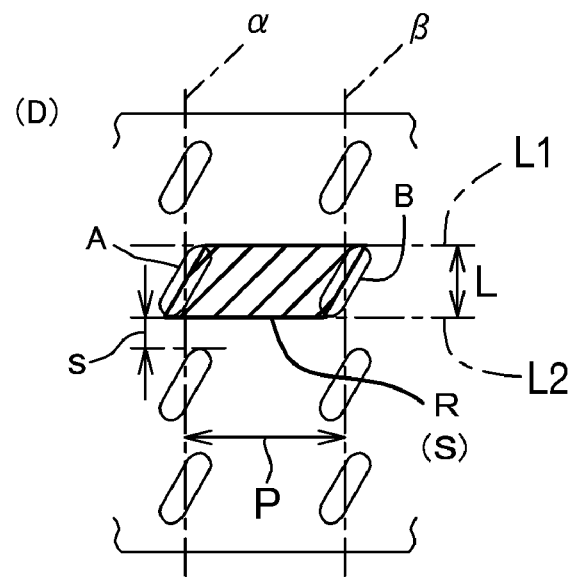
FIGS. 5(D) and (E) are developments showing projections in still different arrangements according to the invention.
Figure 5:
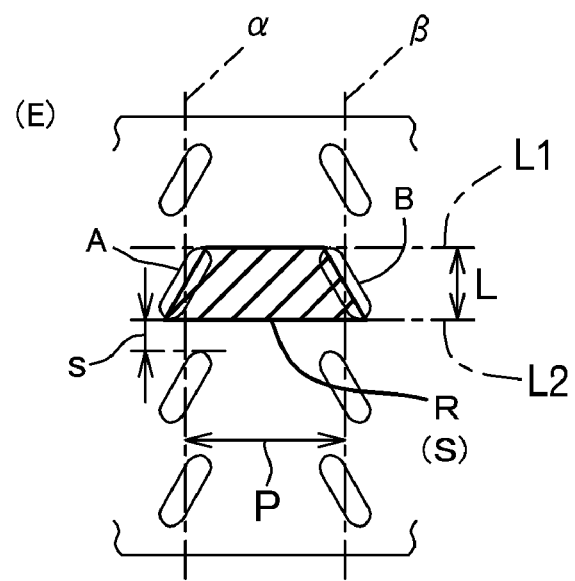

In the case where the angle of inclination θ of the projection row β is different from the angle of inclination of the projection B in the row β, the region R is an area surrounded by the projection A, the projection B and phantom lines L1, L2 as shown in FIGS. 5, (D) and (E).

The ratio of the area S of the region R wherein the projection A acts on the fluid to the tube interior area $10\pi D$ having a unit tube length of 10 mm is limited to 0.7 (preferably 0.6). This gives improved heat transfer characteristics to the fluid and reduces pressure losses as will be understood with reference to Examples. The lower limit of the ratio is 0.2 (preferably 0.3) for the following reason. To make this ratio smaller than 0.2 (preferably 0.3), there arises a need to diminish the length of the projection A and/or the center-to-center distance between the projection A and the projection row β, with the result that a larger number of projections than is necessary are provided on the inner surface of the tube 10. These projections create inappropriate turbulence on the inner surface layer of the tube 10, entailing increased pressure losses and failing to produce the contemplated fluid agitating effect.

The total sum ΣS of the areas S for all the projections to be formed on the inner surface of the thermal cracking tube 10 is preferably at least 80% of the inner surface area of the tube 10. This results in improved heat transfer characteristics and reduced pressure losses as already described generally over the entire length of the tube 10.

[Height h of Projection A]

The height h of the projection A is defined by h/D=0.02-0.05.

The height h of the projection A exerts a great influence on the agitation of the fluid.

As the height h of the projection A increases, the projection A offers resistance, producing an increased pressure loss and presenting difficulty in diminishing the pressure losses of the thermal cracking tube 10. Accordingly the upper limit of the ratio of the height h of the projection A to the inside diameter D of the thermal cracking tube 10 is 0.05.

With a decrease in the height h of the projection A, the effect of the projection A to agitate the fluid becomes seriously impaired, so that the lower limit of the ratio of the height h of the projection A to the inside diameter D of the tube 10 should be 0.02.

[Circular Arc Length L of Projection A in a Direction Orthogonal to Tube Axis]

The length L of circular arc of the projection A in a direction orthogonal to the tube axis is defined by L/πD=0.04-0.5, preferably by L/πD=0.04-0.2.

The circular arc length L of the projection A orthogonal to the tube axis relates to the number of projections included in the projection row, i.e., to the number of the lengths s of circular arcs in a direction orthogonal to the tube axis and corresponding to the end-to-end circular arc distance between projections, and exerts a great influence on pressure losses.

With an increase in the circular arc length L of the projection A orthogonal to the tube axis, the number of the end-to-end spaces between the projections for passing the fluid decreases to result in increased pressure losses. Accordingly the upper limit of the ratio of the length L of circular arc of the projection A in a direction orthogonal to the tube axis to the length of circumference πD of the thermal cracking tube 10 should be 0.5 (preferably 0.2).

With a decrease in the circular arc length L of the projection A orthogonal to the tube axis, the area S on which the projection exerts an influence becomes too small to provide the structure, and suitably agitated turbulence becomes no longer available. Accordingly, the lower limit of the ratio of the length L of circular arc of the projection A in a direction orthogonal to the tube axis to the length of circumference πD of the thermal cracking tube 10 should be 0.04.

[Circular Arc Length s Orthogonal to Tube Axis and Corresponding to the End-to-End Circular Arc Distance between the Projection A and Projection A']

The length s of a circular arc as measured in a direction orthogonal to the tube axis and corresponding to the end-to-end circular arc distance between the projection A and another projection A' adjacent thereto in the projection row α, i.e., the spacing between the projection A and the projection A' should preferably be s/πD≦0.05.

The circular arc length s orthogonal to the tube axis and corresponding to the end-to-end circular arc distance between the projections exerts influence on the range of passage of the fluid and on pressure losses. Accordingly the ratio of the circular arc length s orthogonal to the tube axis and corresponding to the end-to-end circular arc distance between the projections to the length πD of the circumference of the tube 10 should preferably be up to 0.05.

The number of projections in the projection row α is determined by specifying the circular arc length L of the projection A in a direction orthogonal to the tube axis, and the circular arc length s orthogonal to the tube axis and corresponding to the end-to-end circular arc distance. The number of projections is 2 to 25 per projection row.

[Projection Row β]

With respect to the projection row β positioned downstream from the projection A, the region between the phantom lines L1 and L2 downstream from the projection A axially of the tube is preferably provided with one or a plurality of projections B so as to be opposed to the projection A. The reason is that if no projection B of the row β is provided in this region, it is difficult to maintain an agitating action inside the tube because there is an upper limit for the range of influence to be exerted by the fluid agitating projection A, and it is impossible to maintain a high heat transfer efficiency. It is further desired that the projection row β extend over at least 50% of the circular arc length of the above-mentioned region.

The projection rows α, β, projections A, B, etc. thus defined reduce pressure losses to the greatest possible extent while maintaining a high heat transfer efficiency for the fluid inside the tube as will be apparent from Examples to follow.

This makes it possible to avoid overheating while rapidly heating the material fluid to the thermal cracking temperature range thoroughly to the radially central portion of the tube channel to produce the desired product in an improved yield. Furthermore with coking inhibited, decoking work can be dispensed with to produce an increased quantity of product due to an increase in the operation period.

[Other Arrangements of Projections]

Figure 4:
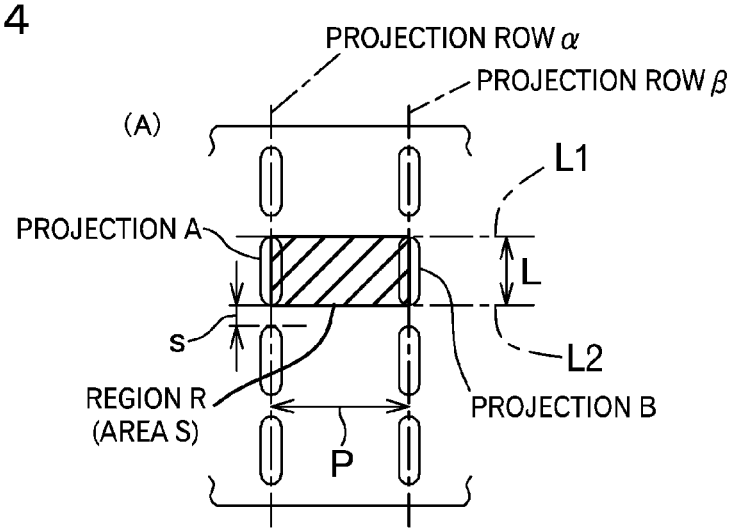
FIGS. 4(A) to (C) are developments showing projections in different arrangements according to the invention.
Figure 4:
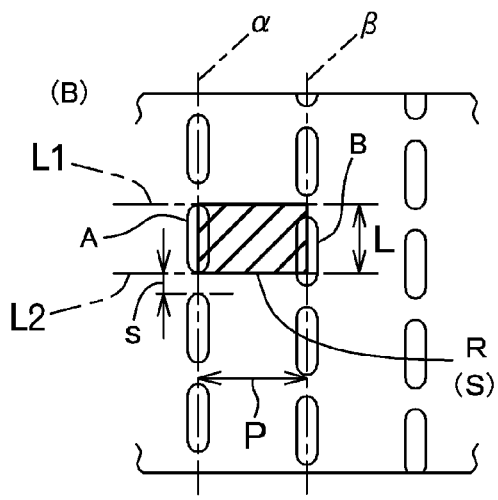
Figure 4:
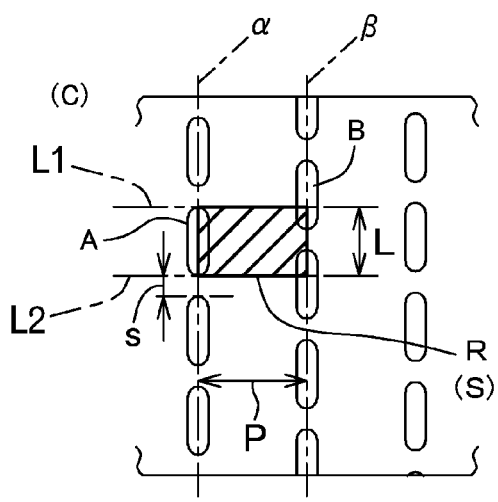

FIGS. 4, (A) to (C) and FIGS. 5, (D) and (E) show other different arrangements of projections A, B. These drawings show projection rows α, β which are annular and independent of each other and are positioned orthogonal to the tube axis, whereas these rows may be inclined with respect to the tube axis as seen in FIG. 3.

FIG. 4, (A) shows an arrangement comprising a projection A and a projection B downstream therefrom and parallel thereto. The space defined by the projection A and phantom lines L1, L2 is completely closed with the projection B.

FIGS. 4, (B) and (C) show arrangements wherein the space defined by a projection A and phantom lines L1, L2 is at least 50% (less than 100%) closed with a projection or projections B. In FIG. 4, (B), the phantom line L1 or L2 intersects with the projection row β at a portion thereof between its opposite ends. FIG. 4, (C) show that the space between the phantom lines L1, L2 includes the entire length of the space between opposed ends of projections of the row β.

FIG. 5, (D) shows an arrangement wherein projections A, B are inclined toward the same direction with respect to projection rows α, β, and FIG. 5, (E) shows an arrangement wherein projections A, B are inclined toward opposite directions with respect to projection rows α, β. In the case of FIG. 5, (D), a region R has a parallelogrammatic area S, while FIG. 5, (E) shows a region R having a trapezoidal area S.

In any of the cases shown in FIGS. 4 and 5, it becomes possible to ensure reduced pressure losses to the greatest possible extent while achieving a high heat transfer efficiency for the fluid inside the tube, by satisfying the definitions as to the projection lows α, β, projections A, B, etc.

EXAMPLES

Specimen tubes were prepared in Examples 1 to 6 of the invention and Comparative Examples 1 to 18, and checked for heat transfer characteristics and pressure losses. Table 1 shows fabrication conditions for the specimen tubes. In Table 1, the lengths are expressed in mm, areas in mm² and projection numbers are numbers of projections.

TABLE 1

| | Inside diam. D | Number Of projections | Height Of projection h | Angle Of inclination $\theta$ | Center-to-center distance P | Circular arc length of projection orthogonal to tube axis L | Circular arc length orthogonal to tube axis and corresponding to end-to-end distance s |
|---|---|---|---|---|---|---|---|
| Example 1 | 38 | 6 | 1.60 | 15 | 32.0 | 14.6 | 5.3 |
| Example 2 | 50 | 6 | 1.90 | 15 | 42.1 | 21.3 | 4.9 |
| Example 3 | 130 | 16 | 3.30 | 10 | 72.0 | 23.2 | 2.3 |
| Example 4 | 150 | 19 | 3.60 | 10 | 83.1 | 23.1 | 1.7 |
| Example 5 | 38 | 6 | 1.11 | 15 | 32.0 | 15.2 | 4.7 |
| Example 6 | 130 | 16 | 2.78 | 10 | 72.0 | 23.6 | 2.0 |
| Comp. Ex. 1 | 50 | 3 | 2.80 | 25 | 73.2 | 47.8 | 4.6 |
| Comp. Ex. 2 | 50 | 6 | 3.00 | 25 | 73.2 | 21.6 | 4.6 |
| Comp. Ex. 3 | 50 | 6 | 3.10 | 25 | 73.2 | 21.6 | 4.6 |
| Comp. Ex. 4 | 50 | 6 | 2.90 | 35 | 110.0 | 22.0 | 4.1 |
| Comp. Ex. 5 | 50 | 6 | 0.82 | 20 | 57.2 | 22.0 | 4.2 |
| Comp. Ex. 6 | 50 | 6 | 1.24 | 20 | 57.2 | 21.6 | 4.6 |
| Comp. Ex. 7 | 50 | 6 | 1.54 | 20 | 57.2 | 21.5 | 4.7 |
| Comp. Ex. 8 | 38 | 4 | 1.66 | 20 | 43.5 | 23.7 | 6.1 |
| Comp. Ex. 9 | 38 | 6 | 2.44 | 34 | 80.5 | 15.0 | 4.9 |
| Comp. Ex. 10 | 38 | 4 | 2.62 | 38 | 93.3 | 21.9 | 8.0 |
| Comp. Ex. 11 | 38 | 6 | 2.40 | 38 | 93.3 | 15.6 | 4.3 |
| Comp. Ex. 12 | 38 | 6 | 2.53 | 30 | 68.9 | 11.6 | 8.3 |
| Comp. Ex. 13 | 38 | 4 | 1.91 | 30 | 68.9 | 19.6 | 10.2 |
| Comp. Ex. 14 | 38 | 4 | 2.00 | 30 | 68.9 | 19.9 | 10.0 |
| Comp. Ex. 15 | 130 | 8 | 5.63 | 20 | 148.6 | 44.4 | 6.7 |
| Comp. Ex. 16 | 38 | 4 | 2.40 | 30 | 68.9 | 23.8 | 6.1 |
| Comp. Ex. 17 | 50 | 4 | 3.00 | 30 | 90.7 | 33.2 | 6.1 |
| Comp. Ex. 18 | 150 | 8 | 5.70 | 20 | 171.5 | 55.1 | 3.8 |

| | Area S/tube interior area 10 nD over unit tube length of 10 mm | Projection height h/ inside diam. D | L/ circumference length nD | s/ circumference length nD | Heat transfer characteristics | Pressure losses |
|---|---|---|---|---|---|---|
| Example 1 | 0.39 | 0.042 | 0.12 | 0.044 | ○ | ○ |
| Example 2 | 0.57 | 0.038 | 0.14 | 0.031 | ○ | ○ |
| Example 3 | 0.41 | 0.025 | 0.06 | 0.006 | ○ | ○ |
| Example 4 | 0.41 | 0.024 | 0.05 | 0.004 | ○ | ○ |
| Example 5 | 0.41 | 0.029 | 0.13 | 0.040 | ○ | ○ |
| Example 6 | 0.42 | 0.021 | 0.06 | 0.005 | ○ | ○ |
| Comp. Ex. 1 | 2.23 | 0.056 | 0.30 | 0.029 | x | x |
| Comp. Ex. 2 | 1.01 | 0.060 | 0.14 | 0.029 | ○ | x |
| Comp. Ex. 3 | 1.01 | 0.062 | 0.14 | 0.029 | ○ | x |
| Comp. Ex. 4 | 1.54 | 0.058 | 0.14 | 0.026 | x | ○ |
| Comp. Ex. 5 | 0.80 | 0.016 | 0.14 | 0.027 | x | ○ |
| Comp. Ex. 6 | 0.79 | 0.025 | 0.14 | 0.029 | x | ○ |
| Comp. Ex. 7 | 0.78 | 0.031 | 0.14 | 0.030 | ○ | x |
| Comp. Ex. 8 | 0.86 | 0.044 | 0.20 | 0.051 | x | ○ |
| Comp. Ex. 9 | 1.01 | 0.064 | 0.13 | 0.041 | x | ○ |
| Comp. Ex. 10 | 1.71 | 0.069 | 0.18 | 0.067 | x | x |
| Comp. Ex. 11 | 1.22 | 0.063 | 0.13 | 0.036 | x | ○ |
| Comp. Ex. 12 | 0.67 | 0.067 | 0.10 | 0.070 | ○ | x |
| Comp. Ex. 13 | 1.13 | 0.050 | 0.16 | 0.086 | x | ○ |
| Comp. Ex. 14 | 1.15 | 0.053 | 0.17 | 0.083 | x | ○ |
| Comp. Ex. 15 | 1.61 | 0.043 | 0.11 | 0.016 | ○ | x |
| Comp. Ex. 16 | 1.37 | 0.063 | 0.20 | 0.051 | ○ | x |
| Comp. Ex. 17 | 1.92 | 0.060 | 0.21 | 0.039 | ○ | x |
| Comp. Ex. 18 | 2.01 | 0.038 | 0.12 | 0.008 | ○ | x |

Given below are the conditions of experiments.
Test fluid: air
Fluid temperature: heated air of 250 to 350° C. for measuring heat transfer characteristics, room temperature for pressure loss measurement
Reynolds number: 25,000-120,000 for measuring heat transfer characteristics, 40,000 to 120,000 for measuring pressure losses
Pressure loss measuring section: 1000 mm-1500 mm For the measurement of heat transfer efficiency, air heated to about 300° C. by a hot air generator was fed to the thermal cracking tube, and temperature variations in the fluid and temperature variations in the tube wall were measured to calculate an average Nusselt number. The fluid temperature was measured by an anemomaster.

Pressure losses were measured by using a blower for sending room temperature air to the tube and a digital manometer for measuring pressure differences. An anemomaster was used for measuring the fluid temperature and the flow velocity thereof.

Table 1 shows the results of measurement. Each of the measurements as expressed by the symbol ○ or x in Table was evaluated as compared with the corresponding characteristic value, serving as a standard, of a conventional product of thermal cracking tube having projections extending continuously circumferentially of the tube without interruption. When showing an improvement not smaller than a predetermined ratio, the measurement was evaluated as ○, whereas if otherwise, the measurement was evaluated as x.

Table 1 shows that the Invention Examples 1 to 6 are excellent in heat transfer characteristics and are reduced tin pressure losses.

On the other hand, Comparative Examples 1 to 18 are inferior in heat transfer characteristics or pressure losses, or in both of these characteristics.

The tubes of Comparative Examples are inferior to those of the invention because they are outside the specified range with respect to one of the ratios of: area S/tube interior area $10\pi D$ over unit tube length of 10 mm, projection height h/inside diameter D, circular arc length L of projection orthogonal to tube axis/circumferential length $\pi D$, and circular arc length s orthogonal to tube axis and corresponding to end-to-end distance/circumferential length $\pi D$, thus failing to fully meet the projection forming conditions or projection row forming conditions. Unsatisfactory heat transfer characteristics lead to the problem of coking in addition to a lower yield.

INDUSTRIAL APPLICABILITY

The invention provides a useful thermal cracking tube adapted to suppress pressure losses to the greatest possible extent while maintaining a heat transfer promoting effect on the fluid inside the tube.

The invention claimed is:

1. A thermal cracking tube for thermally cracking a hydrocarbon fluid material passing through the tube from one end thereof toward the other end, the tube comprising:
an inner surface; and
a plurality of rows of projections extending circumferentially along the inner surface of the tube orthogonal to or as inclined with respect to the axis of tube, each of the projection rows including a plurality of projections provided on the tube inner surface,
wherein the thermal cracking tube satisfying following conditions:

$0.2 \leq S/10\pi D \leq 0.7$, $0.02 \leq h/D \leq 0.05$, and $0.04 \leq L/\pi D \leq 0.5$, wherein D is the inside diameter in mm of the tube,
$10\pi D$ is an interior area in mm² of the tube having the inside diameter D over a unit longitudinal length of 10 mm,
h is the height in mm of projection A arbitrarily chosen from the plurality of projections included in a first projection row α,
L is the length in mm of circular arc of the projection A in a direction orthogonal to the tube axis, and
S is the area in mm² of a region R surrounded by the projection A,
lines L1 and L2 extending respectively from circumferentially opposite ends of the projection A in parallel to the tube axis, and
a second projection row β adjacent to and downstream from the projection row α.

2. The hydrocarbon thermal cracking tube according to claim 1 which is defined by $s/\pi D \leq 0.05$, wherein s is the length of a circular arc orthogonal to the tube axis and corresponding to the end-to-end circular arc distance between the projection A and a second projection A' adjacent thereto in the projection row α.

3. The hydrocarbon thermal cracking tube according to claim 1, wherein between the phantom lines L1 and L2 at one side of the projection A of the projection row α downstream therefrom axially of the tube, the projection row β has at least one projection B as opposed to the projection A.

4. The hydrocarbon thermal cracking tube according to claim 3, wherein the projection B extend over at least 50% of the circular arc length of a space defined by the lines L1 and L2.

5. The hydrocarbon thermal cracking tube according to claim 1 wherein the projection row α and the projection row β are provided generally in parallel, and the region R is approximately parallelogrammatic.

6. The hydrocarbon thermal cracking tube according to claim 1 wherein the total sum ΣS of the areas S for all the projections formed on the inner surface of the tube is at least 80% of the total inner surface area of the tube.

7. The hydrocarbon thermal cracking tube according to claim 1 wherein the projection row α and the projection row β extend helically.

8. The hydrocarbon thermal cracking tube according to claim 1 wherein the projection row α and the projection row β are each provided orthogonal to the tube axis.

9. The hydrocarbon thermal cracking tube according to claim 1 wherein the tube is 30 to 200 mm in inside diameter D.

10. The hydrocarbon thermal cracking tube according to claim 2 wherein the total sum ΣS of the areas S for all the projections formed on the inner surface of the tube is at least 80% of the total inner surface area of the tube.

11. A thermal cracking tube for thermally cracking a hydrocarbon fluid material passing through the tube from one end thereof toward the other end, the tube comprising:
an inner surface; and
a plurality of rows of projections extending circumferentially along the inner surface of the tube orthogonal to or as inclined with respect to the axis of tube, each of the projection rows including at least 6 projections provided on the tube inner surface,
wherein the thermal cracking tube satisfying following conditions:

$0.2 \leq S/10\pi D \leq 0.7$, $0.02 \leq h/D \leq 0.05$, and $0.04 \leq L/\pi D \leq 0.5$, wherein D is the inside diameter in mm of the tube,
$10\pi D$ is an interior area in mm² of the tube having the inside diameter D over a unit longitudinal length of 10 mm,
h is the height in mm of projection A arbitrarily chosen from the plurality of projections included in a first projection row α,
L is the length in mm of circular arc of the projection A in a direction orthogonal to the tube axis, and
S is the area in mm² of a region R surrounded by the projection A,
lines L1 and L2 extending respectively from circumferentially opposite ends of the projection A in parallel to the tube axis, and
a second projection row β adjacent to and downstream from the projection row α.

* * * * *